(12) United States Patent
Lin et al.

(10) Patent No.: US 11,601,267 B2
(45) Date of Patent: Mar. 7, 2023

(54) KEY GENERATOR WITH RESISTIVE MEMORY AND METHOD THEREOF

(71) Applicant: Winbond Electronics Corp., Taichung (TW)

(72) Inventors: Meng-Hung Lin, Taichung (TW); Chia Hua Ho, Hsinchu (TW); Bo-Lun Wu, Changhua County (TW)

(73) Assignee: WINBOND ELECTRONICS CORP., Taichung (TW)

( * ) Notice: Subject to any disclaimer, the term of this patent is extended or adjusted under 35 U.S.C. 154(b) by 1020 days.

(21) Appl. No.: 16/361,796

(22) Filed: Mar. 22, 2019

(65) Prior Publication Data
US 2019/0296906 A1   Sep. 26, 2019

(30) Foreign Application Priority Data

Mar. 23, 2018   (TW) .................................. 107110027

(51) Int. Cl.
*H04L 9/08* (2006.01)
*G11C 13/00* (2006.01)

(52) U.S. Cl.
CPC .......... *H04L 9/0863* (2013.01); *G11C 13/003* (2013.01); *G11C 13/004* (2013.01); *G11C 13/0069* (2013.01); *H04L 9/0866* (2013.01); *G11C 2013/0045* (2013.01); *H04L 2209/08* (2013.01)

(58) Field of Classification Search
CPC . H04L 9/0863; H04L 9/0866; H04L 2209/08; G11C 13/0069; G11C 13/003; G11C 13/004; G11C 2013/0045

USPC ........................................................... 380/44
See application file for complete search history.

(56) References Cited

U.S. PATENT DOCUMENTS

| | | | | |
|---|---|---|---|---|
| 7,532,723 | B2 * | 5/2009 | Chitrapu ................ | H04L 9/3247 726/9 |
| 8,595,274 | B2 * | 11/2013 | Pradhan ................ | H04L 9/0662 708/250 |
| 8,749,265 | B2 * | 6/2014 | Kim .................. | H03K 19/17768 326/8 |
| 9,680,643 | B2 * | 6/2017 | Meyer ................... | H04L 9/0866 |
| 10,269,442 | B1 * | 4/2019 | Tortorelli ............ | H01L 27/2481 |
| 2009/0046499 | A1 * | 2/2009 | Philipp ................ | G11C 13/004 365/163 |
| 2011/0123022 | A1 * | 5/2011 | Oishi ...................... | G06F 7/588 380/46 |
| 2011/0205782 | A1 * | 8/2011 | Costa ................. | G11C 13/0064 365/148 |

(Continued)

FOREIGN PATENT DOCUMENTS

TW            201706991 A        2/2017

*Primary Examiner* — Thanh T Le
(74) *Attorney, Agent, or Firm* — Muncy, Geissler, Olds & Lowe, P.C.

(57) ABSTRACT

A key generator including a first access circuit, a first calculating circuit and a first certification circuit is provided. The first access circuit writes first predetermined data to a first resistive memory cell during a write period and reads a first current passing through the first resistive memory cell after a randomization process. The first calculating circuit calculates the first current to generate a first calculation result. The first certification circuit generates a first password according to the first calculation result.

15 Claims, 5 Drawing Sheets

(56) References Cited

U.S. PATENT DOCUMENTS

| | | | |
|---|---|---|---|
| 2012/0026784 A1* | 2/2012 | Kanai | H04L 9/0866 |
| | | | 365/158 |
| 2012/0319724 A1* | 12/2012 | Plusquellic | G09C 1/00 |
| | | | 29/829 |
| 2013/0241652 A1* | 9/2013 | Chi | H03F 3/68 |
| | | | 330/254 |
| 2013/0250657 A1 | 9/2013 | Haukness | |
| 2016/0328578 A1* | 11/2016 | Plusquellic | G11C 13/004 |
| 2016/0359627 A1* | 12/2016 | Lewis | G06F 21/86 |
| 2018/0278418 A1* | 9/2018 | Chang | H04L 9/0891 |
| 2018/0337793 A1* | 11/2018 | Park | H03K 19/003 |
| 2019/0189209 A1* | 6/2019 | Majumdar | G11C 29/56008 |
| 2019/0198106 A1* | 6/2019 | Parkinson | G11C 13/0069 |
| 2019/0206489 A1* | 7/2019 | Wang | G11C 13/0069 |
| 2019/0214556 A1* | 7/2019 | Chen | H01L 45/1233 |
| 2019/0252605 A1* | 8/2019 | Redaelli | H01L 45/143 |
| 2019/0295641 A1* | 9/2019 | Conte | G11C 13/0004 |
| 2020/0169423 A1* | 5/2020 | Cambou | G11C 13/0069 |

* cited by examiner

KEY GENERATOR WITH RESISTIVE MEMORY AND METHOD THEREOF

CROSS REFERENCE TO RELATED APPLICATIONS

This Application claims priority of Taiwan Patent Application No. 107110027, filed on Mar. 23, 2018, the entirety of which is incorporated by reference herein.

BACKGROUND OF THE INVENTION

Field of the Invention

The invention relates to a key generator, and more particularly to a key generator that provides key randomly.

Description of the Related Art

A key, which can be a number, a sign, or a string, can be transformed using an encryption algorithm to generate ciphertext. The key is often a piece of information. When there is more information available, the security of the ciphertext is greater. When the same plaintext is encrypted using different keys, different ciphertexts are generated.

A conventional method of increasing the security of a device is to dispose a memory (e.g. SRAM) to store a key. However, the conventional method increases the complexity of the device and reduces the usable space of the device. Therefore, the conventional method increases manufacturing costs.

BRIEF SUMMARY OF THE INVENTION

In accordance with an embodiment, a key generator comprises a first access circuit, a first calculating circuit, and a first certification circuit. The first access circuit writes first predetermined data into a first resistive memory cell during a write period and reads a first current passing through the first resistive memory cell after a randomization process. The first calculating circuit calculates the first current to generate a first calculation result. The first certification circuit generates a first password according to the first calculation result.

In accordance with a further embodiment, a key generation method for a resistive random access memory (RRAM) comprises writing predetermined data into a first resistive memory cell during a write period; reading a first current passing through the first resistive memory cell after a randomization process; calculating the first current to generate a first calculation result; and generating a first password according to the first calculation result.

Key generation methods may be practiced by systems that have hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed methods.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
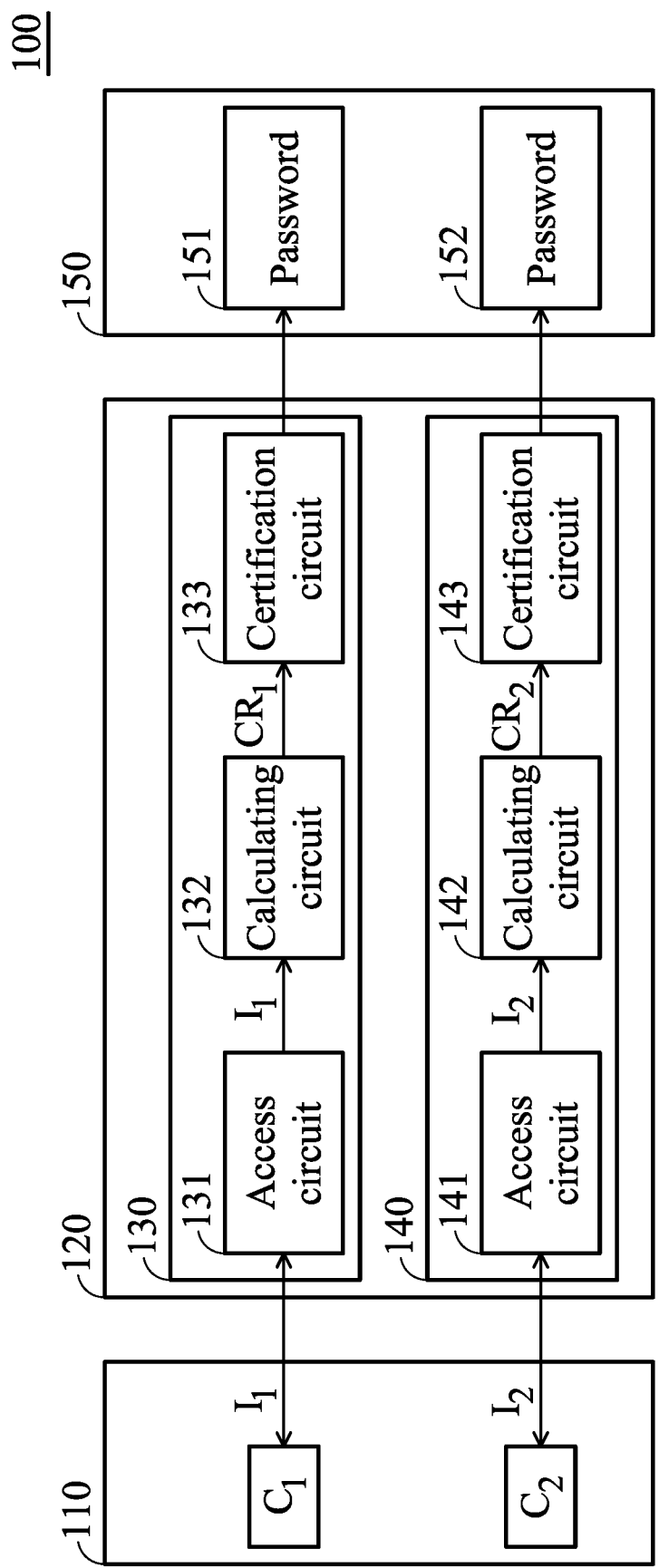
FIG. 1 is a schematic diagram of an exemplary embodiment of an access system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an access system, according to various aspects of the present disclosure. As shown in FIG. 1, the access system 100 comprises a resistive random access memory (RRAM) 110 and a key generator. The RRAM 110 comprises a plurality of resistive memory cells. For brevity, only resistive memory cells $C_1$ and $C_2$ are shown in FIG. 1, but the disclosure is not limited thereto.

The key generator 120 accesses at least one resistive memory cell of the RRAM 110 to generate a key 150. In this embodiment, the key 150 is composed of passwords 151 and 152. In this case, the key 150 has two bits, but the disclosure is not limited thereto. In other embodiments, the RRAM 110 further comprises a memory controller (not shown). The memory controller accesses at least one resistive memory cell according to the command output from the key generator 120. In one embodiment, the key generator 120 is combined in the RRAM 110.

The key generator 120 may comprise two modules 130 and 140 to generate the passwords 151 and 152. When the number of modules in the key generator 120 is more, the number of bits of the key 150 is also greater. For example, when the key generator 120 comprises four modules, the key 150 has four bits. When the key generator 120 comprises eight modules, the key 150 has eight bits.

In this embodiment, the module 130 comprises an access circuit 131, a calculating circuit 132 and a certification circuit 133. The access circuit 131 is configured to access the resistive memory cell $C_1$. During a write period, the access circuit 131 writes first predetermined data to the resistive memory cell $C_1$. In this embodiment, the resistive memory cell $C_1$ is in a low resistance state (LRS) after the write period. In other embodiments, the resistive memory cell $C_1$ may be in a high resistance state (HRS) after the write period.

Next, a randomization process is performed for the RRAM 110. In one embodiment, the randomization process is to heat the RRAM 110. In such case, the RRAM 110 may be disposed in an oven to perform the randomization process. In one embodiment, the temperature in the oven is higher than 200° C. . In other embodiments, the oven may heat the RRAM 110 with 250° C. in the randomization process. After the randomization process, the access circuit 131 reads a current $I_1$ passing through the resistive memory cell $C_1$. The invention does not limit how the access circuit 131 reads the current $I_1$ passing through the resistive memory cell $C_1$. In one embodiment, the access circuit 131 indirectly accesses the RRAM 110. For example, the access circuit 131 first sends a read command. Then, the memory controller (not shown) in the RRAM 110 reads the current passing through the resistive memory cell $C_1$ according to the read command. In another embodiment, the access circuit 131 directly accesses the current passing through the resistive memory cell $C_1$.

The calculating circuit 132 calculates the current $I_1$ to generate a calculation result $CR_1$. In one embodiment, the calculating circuit 132 calculates the difference between the current $I_1$ and a predetermined current IP to generate the calculation result $CR_1$. In one embodiment, the predetermined current IP is pre-stored in the calculating circuit 132.

The certification circuit 133 generates the password 151 according to the calculation result $CR_1$. In one embodiment, the certification circuit 133 compares the calculation result $CR_1$ to a reference value $Iref_1$. When the calculation result $CR_1$ is higher than the reference value $Iref_1$, the password 151 is equal to a first value, such as "1". When the calculation result $CR_1$ is not higher than the reference value $Iref_1$, the password 151 is equal to a second value, such as "0". In this embodiment, the reference value $Iref_1$ is stored in the certification circuit 133 in advance.

The module 140 comprises an access circuit 141, a calculating circuit 142 and a certification circuit 143. In this embodiment, the access circuit 141 is configured to access the resistive memory cell $C_2$. During a write period, the access circuit 141 writes second predetermined data to the resistive memory cell $C_2$. The second predetermined data may be the same as or different from the first predetermined data.

After the randomization process, the access circuit 141 reads a current $I_2$ passing through the resistive memory cell $C_2$. In one embodiment, the randomization process is to heat the RRAM 110. The calculating circuit 142 calculates the current $I_2$ to generate a calculation result $CR_2$. In one embodiment, the calculating circuit 142 calculates the difference between the current $I_2$ and the predetermined current IP to generate the calculation result $CR_2$. The certification circuit 143 generates the password 152 according to the calculation result $CR_2$. In one embodiment, the certification circuit 143 compares the calculation result $CR_2$ to a reference value $Iref_2$. When the calculation result $CR_2$ is higher than the reference value $Iref_2$, the password 152 is equal to a first value, such as "1". When the calculation result $CR_2$ is not higher than the reference value $Iref_2$, the password 152 is equal to a second value, such as "0". The reference value $Iref_2$ may be the same as or different from the reference value $Iref_1$.

In other embodiment, a data retention test is performed for the RRAM 110 to test the retention capability of the RRAM 110. In this case, the RRAM 110 may be disposed in an oven. The temperature of the oven is set. In one embodiment, the temperature of the oven may be 125° C. In this case, the data stored in the RRAM 110 is read to determine whether the RRAM 110 is capable of storing data normally in high temperature.

Figure 2:
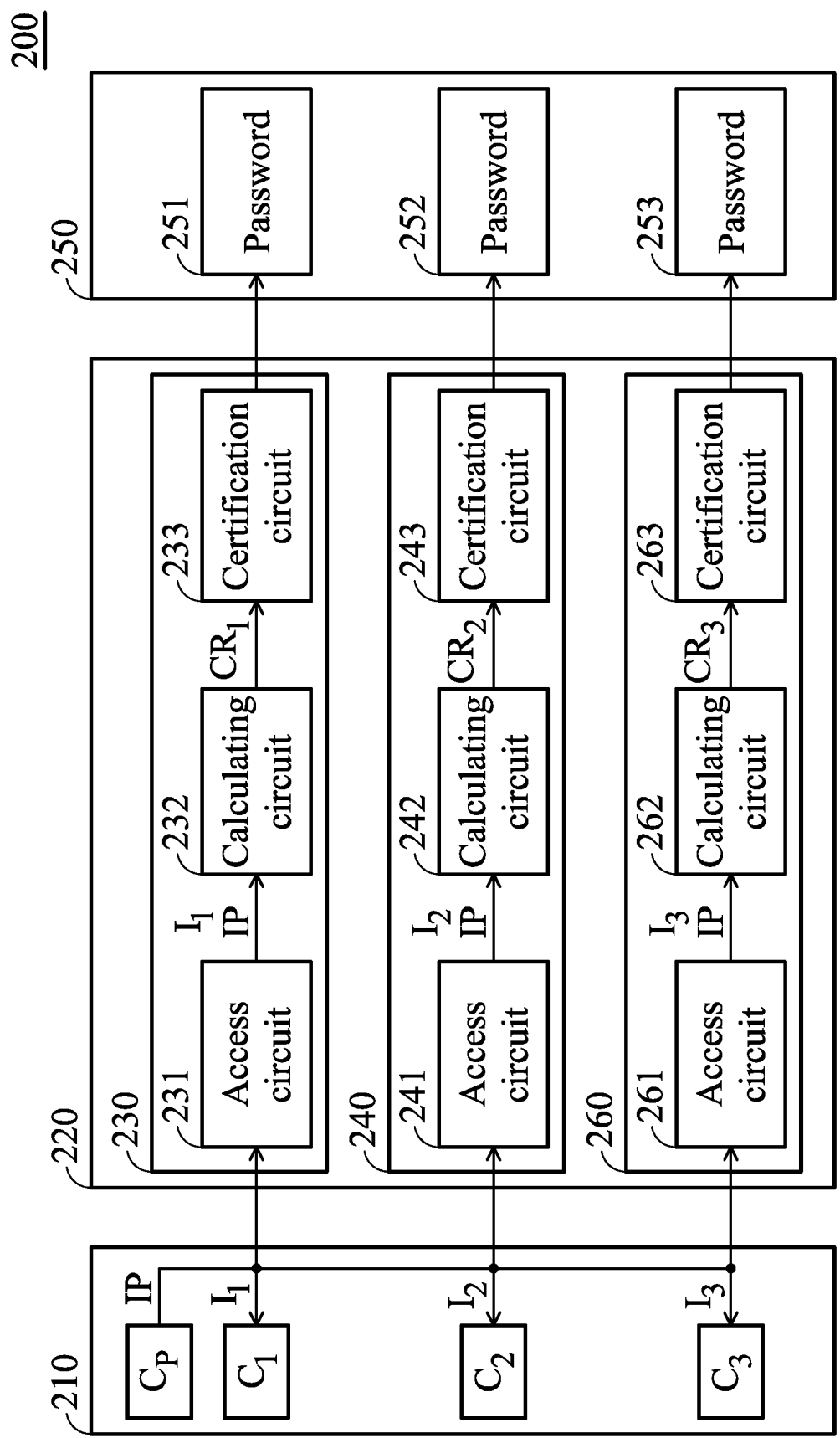
FIG. 2 is a schematic diagram of another exemplary embodiment of the access system, according to various aspects of the present disclosure.

FIG. 2 is a schematic diagram of another exemplary embodiment of the access system, according to various aspects of the present disclosure. In this embodiment, the access system 200 comprises a RRAM 210 and a key generator 220. The key generator 220 accesses the RRAM 210 to generate a key 250. In this embodiment, the key 250 is composed of passwords 251~253. In other embodiment, the key 250 has more passwords or fewer passwords.

The key generator 220 comprises modules 230, 240 and 260. Since the operations of the modules 230, 240 and 260 are the same, only the operation of the module 230 is described. In this embodiment, the module 230 comprises an access circuit 231, a calculating circuit 232 and a certification circuit 233. During a write period, the access circuit 231 writes predetermined data to the resistive memory cell $C_1$. After the write period, the resistive memory cell $C_1$ may be in a HRS or a LRS.

Next, a randomization process is performed for the RRAM 210. In one embodiment, the randomization process is to heat the RRAM 210. After the randomization process, the access circuit 231 reads the current $I_1$ passing through the resistive memory cell $C_1$. Since the method that the access circuit 231 reads the current $I_1$ is the same as the method that the access circuit 131 reads the current $I_1$, the description of the method that the access circuit 231 reads the current $I_1$ is omitted. In this embodiment, the access circuit 231 further reads the current IP passing through the resistive memory cell $C_P$. In this case, the access circuit 231 may write another predetermined data to the resistive memory cell $C_P$ during the write period.

The present disclosure does not limit the sequence for which access circuit 231 reads the currents $I_1$ and $I_P$. In this embodiment, when the access circuit 231 reads the current $I_1$, the access circuit 231 does not read the current IP. When the access circuit 231 reads the current IP, the access circuit 231 does not read the current $I_1$.

The access circuit 231 outputs the currents $I_1$ and IP to the calculating circuit 232. The calculating circuit 232 calculates the currents $I_1$ and IP to generate the calculation result $CR_1$. In one embodiment, the calculating circuit 232 calculates a difference between the currents $I_1$ and IP to generate the calculation result $CR_1$. The certification circuit 233 generates the password 251 according to the calculation result $CR_1$. In one embodiment, the certification circuit 233 compares the calculation result $CR_1$ to a reference value $Iref_1$. Since the operation of the certification circuit 233 shown in FIG. 2 is the same as the operation of the certification circuit 133 shown in FIG. 1, the description of the certification circuit 233 is omitted.

In other embodiments, the RRAM 210 comprises a plurality of switches (not shown). The switches are coupled between the resistive memory cell $C_P$ and $C_1$~$C_3$ and the key generator 220 to provide the corresponding current to the corresponding access circuit. For example, the access circuit 241 only receives the currents $I_1$ and IP, the access circuit 241 only receives the currents $I_2$ and IP and the access circuit 261 only receives the currents $I_3$ and IP.

Figure 3:
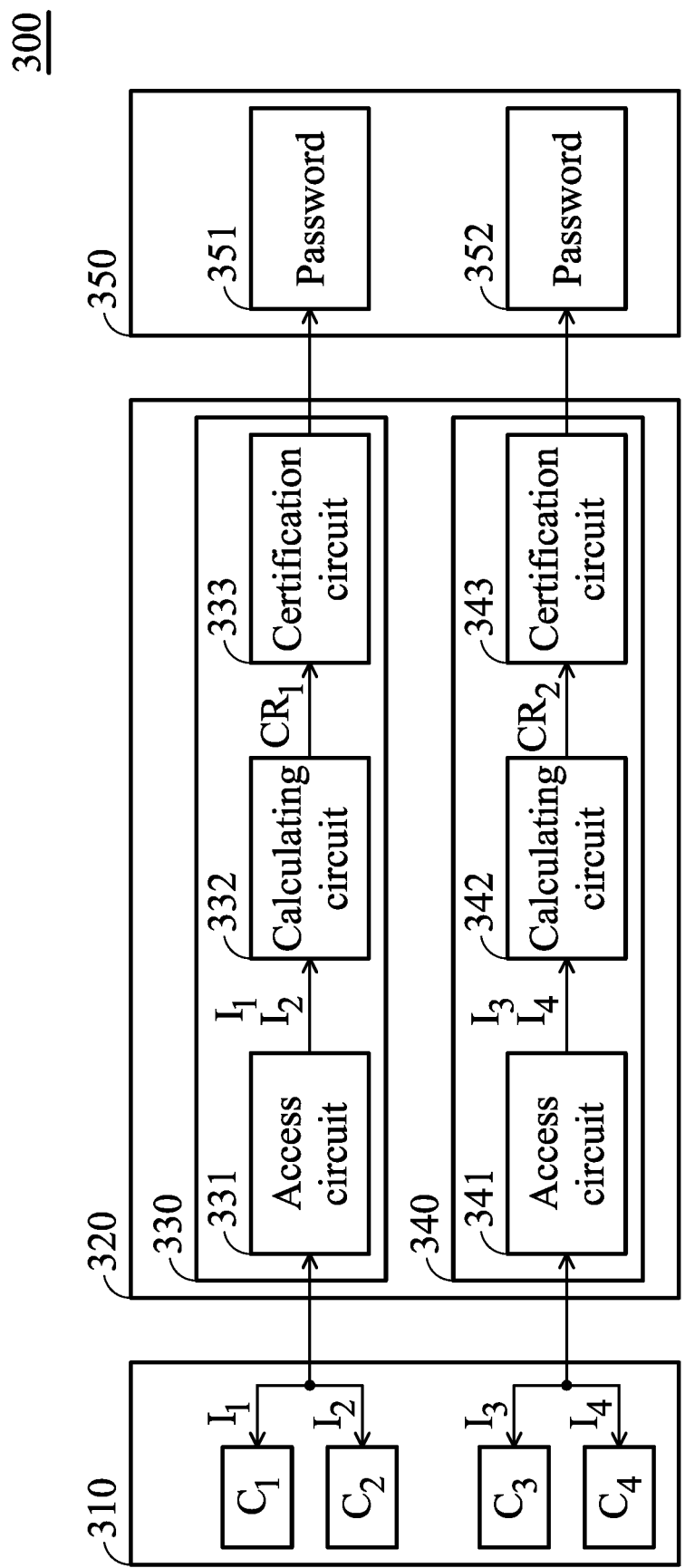
FIG. 3 is a schematic diagram of another exemplary embodiment of the access system, according to various aspects of the present disclosure.

FIG. 3 is a schematic diagram of another exemplary embodiment of the access system, according to various aspects of the present disclosure. In this embodiment, the access system 300 comprises a RRAM 310 and a key generator 320. The key generator 320 accesses the RRAM 310 to generate a key 350. In this embodiment, the key 350 is composed of the passwords 351 and 352.

The key generator 320 comprises modules 330 and 340. Since the operation of the module 330 is the same the operation of the module 340, only the module 330 is given as an example. In this embodiment, the module 330 comprises an access circuit 331, a calculating circuit 332 and a certification circuit 333. The access circuit 331 is configured to access the resistive memory cells $C_1$ and $C_2$. In other embodiment, the access circuit 331 may access more resistive memory cells.

During a write period, the access circuit 331 writes first predetermined data to the resistive memory cell $C_1$ and write second predetermined data to the resistive memory cell $C_2$. The first predetermined data may be the same as or different from the second predetermined data. After the write period, both of the resistive memory cells $C_1$ and $C_2$ may be in a HRS or a LRS. In some embodiment, the resistance of the resistive memory cell $C_1$ is different from the resistance of the resistive memory cell $C_2$. Then, a randomization process is performed for the RRAM 310. After the randomization process, the access circuit 331 reads the current $I_1$ passing through the resistive memory cell $C_1$ and the current $I_2$ passing through the resistive memory cell $C_2$.

The calculating circuit 332 calculates the currents $I_1$ and $I_2$ to generate a calculation result $CR_1$. The present disclosure does not limit how the calculating circuit 332 calculates the currents $I_1$ and $I_2$. In one embodiment, the calculating circuit 332 calculates a difference between the currents $I_1$ and $I_2$ to generate the calculation result $CR_1$. In other embodiments, assume that the access circuit 331 accesses three resistive memory cells referred to as a first resistive memory cell, a second resistive memory cell and a third resistive memory cell. In this case, the calculating circuit 332 calculates a first current passing through the first resistive memory cell, a second current passing through the second resistive memory cell and a third current passing through the third resistive memory cell. In one embodiment, the calculating circuit 332 may first calculate a first current difference between the first current passing through the first resistive memory cell and the second current passing through the second resistive memory cell, then calculates a second current difference between the second current passing through the second resistive memory cell and the third current passing through the third resistive memory cell, averages the first and second current differences to generate an average value and provides the average value as the calculation result $CR_1$. In other embodiment, the calculating circuit 332 may perform other operations, such as the four fundamental operations of arithmetic, for the first, second and third currents.

The certification circuit 333 generates the password 351 according to the calculation result $CR_1$. In one embodiment, the certification circuit 333 compares the calculation result $CR_1$ to a reference value $Iref_1$. The invention does not limit the circuit structure of the certification circuit 333. In one embodiment, the certification circuit 333 comprises a comparator. Since the operation of the certification circuit 333 shown in FIG. 3 is the same as the operation of the certification circuit 133 shown in FIG. 1, the description of the certification circuit 333 is omitted.

Figure 4:
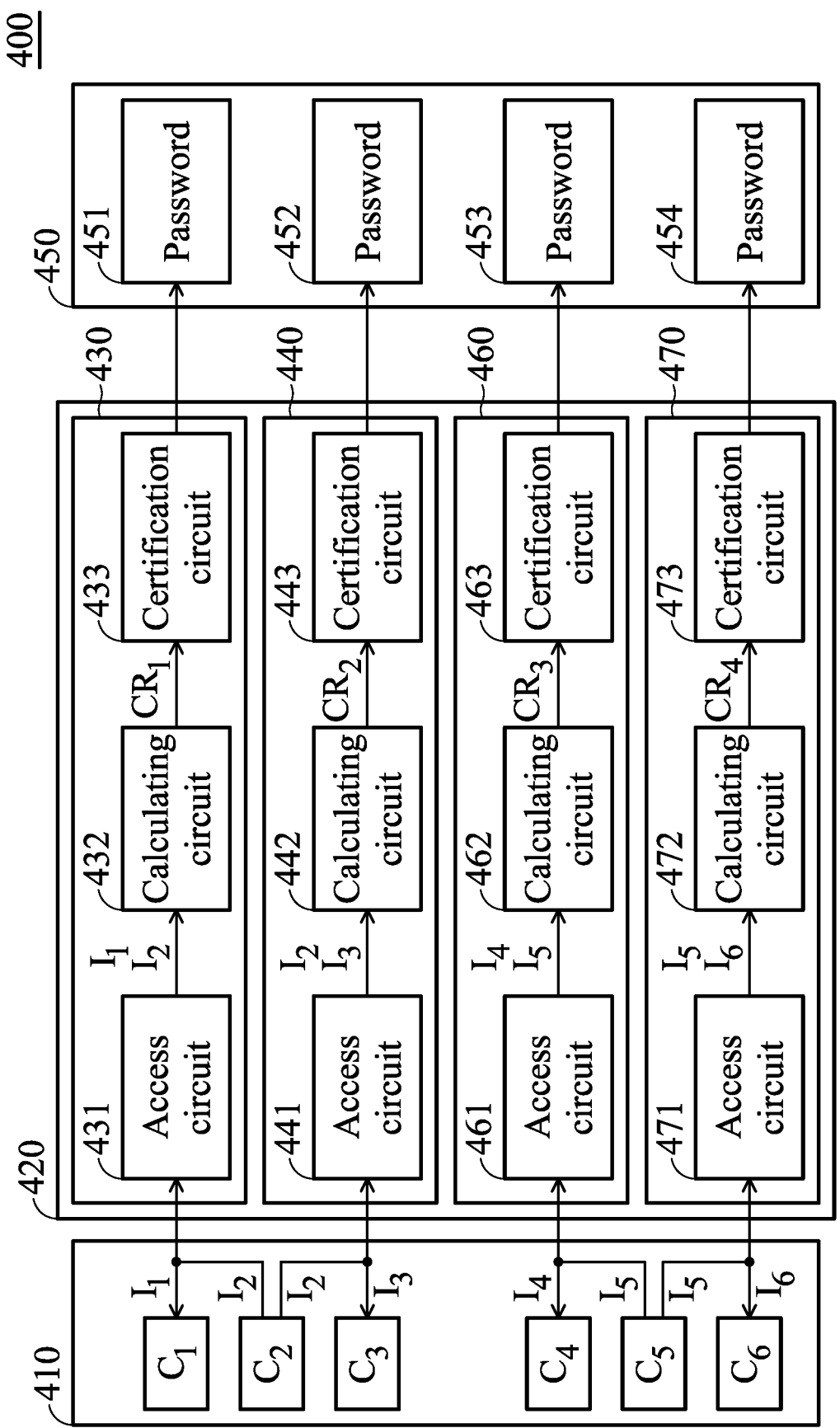
FIG. 4 is a schematic diagram of another exemplary embodiment of the access system, according to various aspects of the present disclosure.

FIG. 4 is a schematic diagram of another exemplary embodiment of the access system, according to various aspects of the present disclosure. In this embodiment, the access system 400 comprises a RRAM 410 and a key generator 420. The key generator 420 accesses the RRAM 410 to generate a key 450. In this embodiment, the key 450 comprises passwords 451~454.

The key generator 420 comprises modules 430, 440, 460 and 470. In this embodiment, the modules 430 and 440 shares the resistive memory cell $C_2$ and the modules 460 and 470 shares the resistive memory cell $C_5$. Since the operations of the modules 430 and 440 are the same as the operations of the modules 460 and 470, the modules 430 and 440 are given as an example.

The module 430 comprises an access circuit 431, a calculating circuit 432 and a certification circuit 433. The access circuit 431 is configured to access the resistive memory cells $C_1$ and $C_2$. In other embodiments, the access circuit 431 may access more resistive memory cells. During a write period, the access circuit 431 writes first predetermined data to the resistive memory cell $C_1$ and writes second predetermined data to the resistive memory cell $C_2$. After a randomization process, the access circuit 431 reads the current $I_1$ passing through the resistive memory cell $C_1$ and the current $I_2$ passing through the resistive memory cell $C_2$.

The calculating circuit 432 calculates the currents $I_1$ and $I_2$ to generate the calculation result $CR_1$. In one embodiment, the calculating circuit 432 calculates the difference between the currents $I_1$ and $I_2$ to generate the calculation result $CR_1$.

The certification circuit 433 generates the password 451 according to the calculation result $CR_1$. The certification circuit 433 compares the calculation result $CR_1$ to a reference value $Iref_1$. Since the operation of the certification circuit 433 shown in FIG. 4 is the same as the operation of the certification circuit 133 shown in FIG. 1, the description of the operation of the certification circuit 433 is omitted.

The module 440 comprises an access circuit 441, a calculating circuit 442 and a certification circuit 443. During a write period, the access circuit 441 writes third predetermined data to the resistive memory cell $C_3$. After the randomization process, the access circuit 441 reads the current $I_3$ passing through the resistive memory cell $C_3$ and the current $I_2$ passing through the resistive memory cell $C_2$.

The calculating circuit 442 calculates the currents $I_2$ and $I_3$ to generate a calculation result $CR_2$. In one embodiment, the calculating circuit 442 calculates the difference between the currents $I_2$ and $I_3$ to generate the calculation result $CR_2$. The certification circuit 443 generates the password 452 according to the calculation result $CR_2$.

In one embodiment, the certification circuit 443 compares the calculation result $CR_2$ to a reference value $Iref_2$. Since the operation of the certification circuit 433 shown in FIG. 4 is the same as the operation of the certification circuit 133 shown in FIG. 1, the description of the operation of the certification circuit 433 is omitted.

Figure 5:
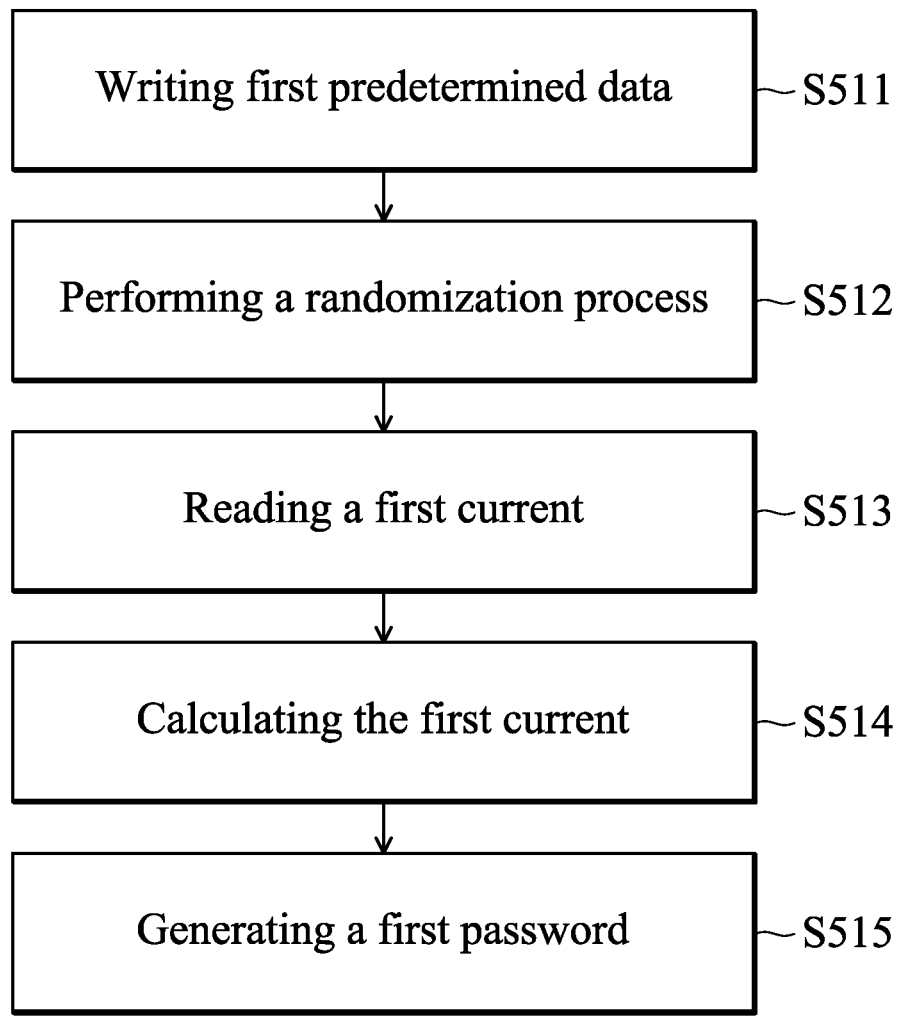
FIG. 5 is a flowchart of an exemplary embodiment of a key generation method, according to various aspects of the present disclosure.

FIG. 5 is a flowchart of an exemplary embodiment of a key generation method, according to various aspects of the present disclosure. The key generation method is applied to a RRAM. First, first predetermined data is written into a first resistive memory cell during a write period (step S511). In one embodiment, the first resistive memory cell comprises a transistor and a resistive storing element. After the first predetermined data is written into the first resistive memory cell, the resistance of the resistive storing element is in a HRS or a LRS.

Next, a randomization process is performed for the RRAM (step S512). In one embodiment, the randomization process is to heat the RRAM. In this case, the RRAM is disposed in an oven. In one embodiment, the temperature of the oven may be higher than 200° C.

The first current passing through the first resistive memory cell is read (step S513). The invention does not limit how step S513 reads the first current passing through the first resistive memory cell. In one embodiment, step S513 is to provide a read voltage to the transistor of the first resistive memory cell and then measures the current passing through the resistive storing element of the first resistive memory cell.

The first current is calculated to generate a first calculation result (step S514). In one embodiment, step S514 is to calculate the difference between the first current and a predetermined current to generate the first calculation result.

A first password is generated according to the first calculation result (step S515). In one embodiment, the first calculation result is compared to a reference value in step S515. When the first calculation result is higher than the reference value, the first password is equal to a first value, such as "1". When the first calculation result is not higher than the reference value, the first password is equal to a second value, such as "0".

In other embodiments, step S511 writes second predetermined data to a second resistive memory cell. In this case, step S513 reads a second current passing through the second resistive memory cell, and step S514 calculates the first and second currents to generate the first calculation result. In one embodiment, step S514 calculates the difference between the first and second currents to generate the first calculation result.

In some embodiments, step S511 writes second predetermined data to a second resistive memory cell and writes third predetermined data to a third resistive memory cell. In this case, step S513 reads a second current passing through the second resistive memory cell and a third current passing through the third resistive memory cell. Step S514 calculates the first current to generate a first calculation result and calculates the third current to generate a second calculation result. In one embodiment, step S514 calculates the difference between the first and second currents to generate the first calculation result. In this case, step S514 calculates the difference between the second and third currents to generate the second calculation result. Additionally, step S515 generates a first password according to the first calculation result and generates a second password according to the second calculation result.

In another embodiment, step S511 writes second predetermined data to a second resistive memory cell, writes third predetermined data to a third resistive memory cell and writes fourth predetermined data to a fourth resistive memory cell. In this case, step S513 reads a first current passing through the first resistive memory cell, a second current passing through the second resistive memory cell, a third current passing through the fourth resistive memory cell and a fourth current passing through the fourth resistive memory cell. Step S514 calculates the first and second currents to generate a first calculation result and calculates the third and fourth currents to generate a second calculation result. In one embodiment, step S514 is to calculate the difference between the first and second currents to generate the first calculation result. In such case, step S514 is to calculate the difference between the third and fourth currents to generate the second calculation result. Furthermore, step S515 generates a first password according to the first calculation result and generates a second password according to the second calculation result.

After heating the RRAM, the currents passing through the resistive memory cells cannot be forecasted. Therefore, if the currents passing through the resistive memory cells are utilized to generate a key, the value of the key cannot be forecasted such that the reliability of the key is increased.

Key generation methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A key generator comprising:
   a first access circuit writing first predetermined data to a first resistive memory cell during a write period and reading a first current passing through the first resistive memory cell after a randomization process;
   a first calculating circuit calculating the first current to generate a first calculation result; and
   a first certification circuit generating a first password according to the first calculation result;
   wherein, the randomization process is to heat the first resistive memory cell.

2. The key generator as claimed in claim 1,
   wherein the first certification circuit compares the first calculation result to a reference value,
   wherein when the first calculation result is higher than the reference value, the first password is equal to a first value, and when the first calculation result is not higher than the reference value, the first password is equal to a second value that is the opposite of the first value.

3. The key generator as claimed in claim 2, wherein the first calculating circuit calculates a difference between the first current and a predetermined current to generate the first calculation result.

4. The key generator as claimed in claim 1,
   wherein during the write period, the first access circuit writes second predetermined data to a second resistive memory cell, and
   wherein after the randomization process, the first access circuit reads a second current passing through the second resistive memory cell, and the first calculating circuit calculates the first and second currents to generate the first calculation result.

5. The key generator as claimed in claim 4, wherein the first calculating circuit calculates a difference between the first and second currents to generate the first calculation result.

6. The key generator as claimed in claim 4, further comprising:
a second access circuit writing third predetermined data to a third resistive memory cell during the write period and reading a third current passing through the third resistive memory cell after the randomization process;
a second calculating circuit calculating the third current to generate a second calculation result; and
a second certification circuit generating a second password according to the second calculation result.

7. The key generator as claimed in claim 6, wherein the second calculating circuit calculates a difference between the second and third currents to generate the second calculation result.

8. The key generator as claimed in claim 6,
wherein during the write period, the second access circuit writes fourth predetermined data to a fourth resistive memory cell, and
wherein after the randomization process, the second access circuit reads a fourth current passing through the fourth resistive memory cell and the second calculating circuit calculates the third and fourth currents to generate the second calculation result.

9. The key generator as claimed in claim 8, wherein the second calculating circuit calculates a difference between the third and fourth currents to generate the second calculation result.

10. The key generator as claimed in claim 1, wherein after the first predetermined data is written into the first resistive memory cell, the first resistive memory cell is in a low resistance state.

11. A key generation method for a resistive random access memory (RRAM), comprising:
writing predetermined data to a first resistive memory cell during a write period;
reading a first current passing through the first resistive memory cell after a randomization process;
calculating the first current to generate a first calculation result; and
generating a first password according to the first calculation result;
wherein, the randomization process is to heat the first resistive memory cell.

12. The key generation method as claimed in claim 11, wherein the step of generating the first password according to the first calculation result comprises comparing the first calculation result to a reference value, and
wherein when the first calculation result is higher than the reference value, the first password is equal to a first value, and when the calculation result is not higher than the reference value, the first password is equal to a second value.

13. The key generation method as claimed in claim 12, wherein the step of calculating the first current to generate the first calculation result comprises calculating a difference between the first current and a predetermined current.

14. The key generation method as claimed in claim 11, further comprising:
writing second predetermined data to a second resistive memory cell during the write period; and
reading a second current passing through the second resistive memory cell after the randomization process, wherein the step of calculating the first current to generate the first calculation result comprises calculating the first and second currents.

15. The key generation method as claimed in claim 14, further comprising:
writing third predetermined data to a third resistive memory cell and writing fourth predetermined data to a fourth resistive memory cell during the write period;
reading a third current passing through the third resistive memory cell and reading a fourth current passing through the fourth resistive memory cell after the randomization process;
calculating a difference between the second and third currents or calculating a difference between the third and fourth currents to generate a second calculation result; and
generating a second password according to the second calculation result.

* * * * *